United States Patent
Paczkowski et al.

(10) Patent No.: US 10,318,723 B1
(45) Date of Patent: Jun. 11, 2019

(54) HARDWARE-TRUSTED NETWORK-ON-CHIP (NOC) AND SYSTEM-ON-CHIP (SOC) NETWORK FUNCTION VIRTUALIZATION (NFV) DATA COMMUNICATIONS

(71) Applicant: Sprint Communications Company L.P., Overland Park, KS (US)

(72) Inventors: Lyle Walter Paczkowski, Mission Hills, KS (US); Marouane Balmakhtar, Alexandria, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 165 days.

(21) Appl. No.: 15/364,097

(22) Filed: Nov. 29, 2016

(51) Int. Cl.
*H04L 29/06* (2006.01)
*G06F 21/44* (2013.01)
*G06F 15/78* (2006.01)
*G06F 9/54* (2006.01)
*G06F 21/62* (2013.01)

(52) U.S. Cl.
CPC ............... *G06F 21/44* (2013.01); *G06F 9/54* (2013.01); *G06F 15/7825* (2013.01); *G06F 21/6281* (2013.01)

(58) Field of Classification Search
CPC .. G06F 21/44; G06F 21/6281; G06F 15/7825; G06F 9/54
See application file for complete search history.

(56) References Cited

U.S. PATENT DOCUMENTS

| 7,010,551 | B2 * | 3/2006 | Terayama | G06F 16/9577 |
| 7,526,785 | B1 * | 4/2009 | Pearson | G06F 21/57 |
| | | | | 725/31 |
| 8,074,262 | B2 * | 12/2011 | Scarlata | G06F 21/53 |
| | | | | 726/4 |
| 8,176,336 | B1 * | 5/2012 | Mao | H04L 9/006 |
| | | | | 713/189 |

(Continued)

FOREIGN PATENT DOCUMENTS

| WO | 2015008252 | 1/2015 |
| WO | 2015113046 | 7/2015 |
| WO | 2015167595 | 11/2015 |

OTHER PUBLICATIONS

"Network Functions Virtualisation (NFV); NFV Security; Security and Trust Guidance;" ETSI GS NFV-SEC 003; Dec. 2014; pp. 1-57; V1.1.1; ETSI; Sophia Antipolis Cedex, France.

*Primary Examiner* — David Garcia Cervetti

(57) ABSTRACT

A Central Processing Unit (CPU) comprising an internal Network-On-Chip (NOC) core and multiple internal System-On-Chip (SOC) cores communicates with external CPUs comprising external NOC cores and external SOC cores. The internal NOC core exchanges hardware trust data with the internal SOC cores and the external NOC cores to maintain hardware trust. The internal SOC cores execute Virtual Network Functions (VNFs) and responsively exchange user data with the internal NOC core for the NFV VNFs. The internal NOC core exchanges an allowed portion of the user data for the VNFs among the internal SOC cores and the external NOC cores. The internal NOC core blocks (Continued)

a disallowed portion of the user data to an internal SOC core or an external NOC core when hardware trust fails between the internal NOC core and the individual SOC core or NOC core.

18 Claims, 6 Drawing Sheets

(56) References Cited

U.S. PATENT DOCUMENTS

| | | | |
|---|---|---|---|
| 8,516,529 B2 | 8/2013 | Lajoie et al. | |
| 8,971,538 B1* | 3/2015 | Marr | H04L 63/145 380/285 |
| 9,049,186 B1* | 6/2015 | Paczkowski | H04W 12/08 |
| 9,202,047 B2 | 12/2015 | Gupta et al. | |
| 9,405,700 B2* | 8/2016 | Wingard | G06F 12/1027 |
| 9,432,356 B1* | 8/2016 | Johansson | H04L 63/0823 |
| 9,578,008 B2* | 2/2017 | Sood | H04L 63/08 |
| 9,672,052 B1* | 6/2017 | Berreth | G06F 9/544 |
| 9,756,084 B2* | 9/2017 | Olivier | H04L 65/1016 |
| 9,778,939 B2* | 10/2017 | Johansson | H04L 63/0823 |
| 9,781,041 B2* | 10/2017 | Jain | H04L 47/125 |
| 9,979,699 B1* | 5/2018 | Marquardt | H04L 63/0272 |
| 2002/0095578 A1* | 7/2002 | Yamada | H04L 9/321 713/176 |
| 2003/0208570 A1* | 11/2003 | Lapidous | H04L 29/06 709/222 |
| 2006/0199538 A1* | 9/2006 | Eisenbach | G06F 21/6218 455/41.2 |
| 2007/0226786 A1* | 9/2007 | Berger | G06F 21/57 726/9 |
| 2009/0013404 A1 | 1/2009 | Chow et al. | |
| 2011/0041126 A1* | 2/2011 | Levy | G06F 9/5072 718/1 |
| 2011/0131627 A1* | 6/2011 | Abendroth | G06F 21/41 726/1 |
| 2011/0145821 A1* | 6/2011 | Philipson | G06F 21/83 718/1 |
| 2011/0276490 A1* | 11/2011 | Wang | G06Q 10/00 705/50 |
| 2011/0302415 A1* | 12/2011 | Ahmad | G06F 21/57 713/168 |
| 2012/0089481 A1* | 4/2012 | Iozzia | G06F 21/31 705/26.41 |
| 2012/0266252 A1* | 10/2012 | Spiers | H04L 63/0218 726/26 |
| 2012/0278864 A1* | 11/2012 | Dugeon | H04L 12/2834 726/4 |
| 2014/0173686 A1* | 6/2014 | Kgil | H04L 63/205 726/1 |
| 2014/0201374 A1* | 7/2014 | Ashwood-Smith | H04L 49/70 709/226 |
| 2014/0351600 A1* | 11/2014 | Robbins | H04B 1/38 713/176 |
| 2015/0200915 A1* | 7/2015 | Yeager | G06F 16/22 713/155 |
| 2015/0288541 A1* | 10/2015 | Fargano | H04L 43/08 709/225 |
| 2015/0304459 A1* | 10/2015 | Pakula | H04L 67/02 709/203 |
| 2016/0034411 A1 | 2/2016 | Smith et al. | |
| 2016/0191469 A1* | 6/2016 | Zatko | H04L 63/0428 713/150 |
| 2016/0219076 A1 | 7/2016 | Paczkowski et al. | |
| 2016/0226913 A1* | 8/2016 | Sood | H04L 63/20 |
| 2016/0269192 A1* | 9/2016 | Evans | H04L 65/605 |
| 2016/0330613 A1* | 11/2016 | Cook | G06F 9/45558 |
| 2016/0373474 A1* | 12/2016 | Sood | H04L 63/1425 |
| 2017/0103382 A1* | 4/2017 | Kim | G06Q 20/3278 |
| 2017/0149807 A1* | 5/2017 | Schilling | G06F 21/56 |
| 2017/0214694 A1* | 7/2017 | Yan | H04L 63/20 |
| 2018/0004938 A1* | 1/2018 | Schilling | G06F 21/56 |
| 2018/0004953 A1* | 1/2018 | Smith, II | H04L 63/1441 |

* cited by examiner

_US 10,318,723 B1_

HARDWARE-TRUSTED NETWORK-ON-CHIP (NOC) AND SYSTEM-ON-CHIP (SOC) NETWORK FUNCTION VIRTUALIZATION (NFV) DATA COMMUNICATIONS

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Network Function Virtualization (NFV) computer systems deliver these data communication services.

NFV computer systems have Virtual Network Functions (VNFs) that perform like typical communication network elements or portions of these network elements. The VNFs run under the control of a hypervisor or operating system that controls VNF access to NFV hardware (circuitry, memory, communication interfaces). The VNFs communicate with one another and with other systems over NFV virtual Switches (vSWs) implemented by the hypervisor or operating system.

NFV computer systems implement hardware trust. Hardware trust entails the physical verification of physically-embedded read-only hardware identifiers. A hardware trust controller in the hardware reads its hardware identifier and hashes it with a random number. The hardware trust controller then transfers the hash result for external hardware trust verification by a hardware trust monitor. The hardware trust monitor performs a corresponding hash with the hardware identifier and the random number to verify the hash result and hardware trust. The hardware trust monitor distributes hardware trust data to the hardware trust controllers.

NFV computer systems implement multi-core Central Processing Units (CPUs). Some of the CPU cores are System-on-a-Chip (SOC) cores that run NFV Virtual Network Functions (VNFs). Some of the CPU cores are Network-on-a-Chip (NOC) cores that interconnect the SOCs with each other and with external data systems. Unfortunately, the SOCs and NOCs in a multi-core CPU do not effectively and efficiently provide hardware trusted communications to the NFV VNFs.

TECHNICAL OVERVIEW

A Network Function Virtualization (NFV) Central Processing Unit (CPU) comprising an internal Network-On-Chip (NOC) core and multiple internal System-On-Chip (SOC) cores communicates with external CPUs comprising external NOC cores and external SOC cores. The internal NOC core exchanges hardware trust data with the internal SOC cores and the external NOC cores to maintain hardware trust. The internal SOC cores execute Virtual Network Functions (VNFs) and responsively exchange user data with the internal NOC core for the NFV VNFs. The internal NOC core exchanges an allowed portion of the user data for the VNFs among the internal SOC cores and the external NOC cores. The internal NOC core blocks a disallowed portion of the user data to an internal SOC core or an external NOC core when hardware trust fails between the internal NOC core and the individual SOC core or NOC core.

DETAILED DESCRIPTION

Figure 1:
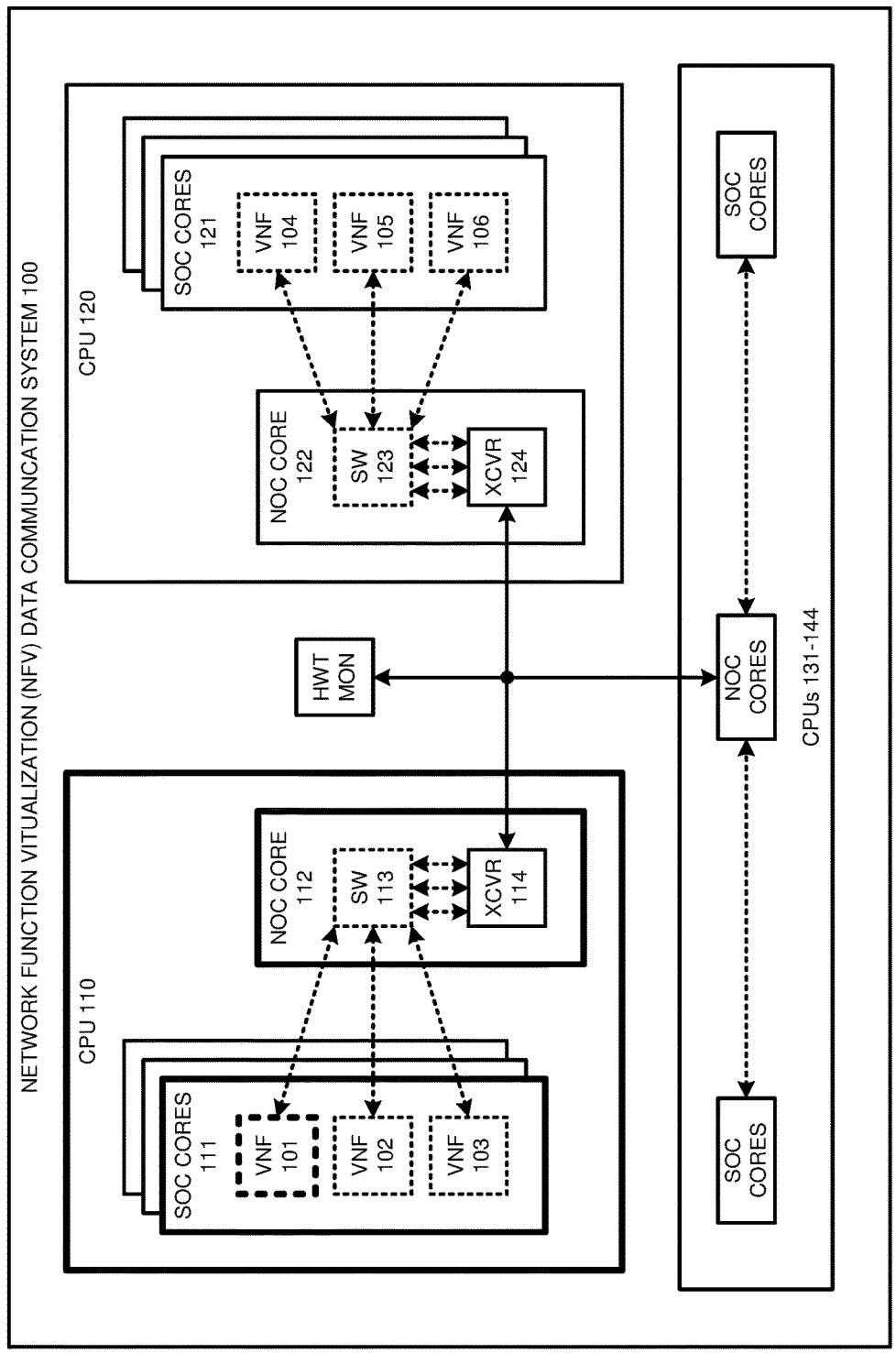
FIG. 1 illustrates a Network Function Virtualization (NFV) data communication system that implements hardware trust for Virtual Network Functions (VNFs) in Central Processing Units (CPUs) having System-On-Chip (SOC) cores and Network-On-Chip (NOC) cores.

FIG. 1 illustrates Network Function Virtualization (NFV) data communication system 100 that implements hardware trust for Virtual Network Functions (VNFs) in Central Processing Units (CPUs) that have System-On-Chip (SOC) cores and Network-On-Chip (NOC) cores. The data communication service might be content streaming, media conferencing, machine communications, internet access, or some other computerized information service. Referring to FIG. 1, NFV communication system 100 comprises CPUs 110, 120, and 131-144. CPU 110 comprises SOC cores 111 and NOC core 112. SOC cores 111 each execute VNFs including VNFs 101-103. NOC core 112 comprises data switch 113 (SW) and transceiver (XCVR) 114. Likewise, CPU 120 comprises SOC cores 121 and NOC core 122. CPU 120 comprises SOC cores 121 and NOC core 122. SOC cores 121 each execute VNFs including VNFs 104-106. NOC core 122 comprises data switch 123 and transceiver 124. CPUs 131-144 have SOC cores and NOC cores like cores 111-112 and 121-122.

Cores 111-112 and 121-122 each comprise micro-processing circuitry and software embedded within a CPU. VNFs 101-106 comprise networking software to drive the SOC cores to perform functions like routing, authorizing, inspecting, or coding. Data switches 113 and 123 comprise switching software to drive the NOC cores to exchange data among the VNFs and the transceivers. Data transceivers 114 and 124 comprise networking circuitry and processors that execute communication protocol software to exchange data between data switches 112 and 122 and external data communication links and networks. The external data communication links and networks might include Software-Defined Network (SDN) switches, Ethernet switches, Internet Protocol (IP) routers, and the like—including combinations thereof.

NFV data communication system 100 implements hardware trust for VNFs 101-106. Hardware trust entails the physical verification of physically-embedded read-only hardware identifiers. In some examples, a hardware trust controller in the hardware reads the hardware identifier and hashes it with a random number. The hardware trust controller then transfers the hash result for external hardware trust verification.

For example, a hardware trust software module in NOC core 112 may receive a random number challenge from a hardware trust monitor (HWT MON). The hardware trust software module reads its hardware identifier and hashes the random number against the hardware identifier to generate a hardware trust result. The hardware trust software module transfers the hardware trust result from CPU 110 for external hardware trust verification by the hardware trust monitor. The hardware trust monitor replicates the hash for hardware trust verification. The hardware trust monitor may distribute hardware trust data for CPUs, cores, switches, routers, and various other components that have an embedded hardware trust identifier and a hardware trust controller.

The hardware trust data further includes networking data associated with the trusted hardware. The data may indicate VNF Component (VNFC) identifiers, SOC identifiers, NOC identifiers, hypervisor state information and processing threads, operating system container information, data transceiver identifiers, and wireless data communication protocols. The hardware trust data may indicate items that are related to the trusted hardware in the time domain like currently executing VNFs and vSWs, current network addresses, served user/device identifiers, forwarding graphs, uniform resource identifiers, and the like.

Note that NOC core 112 may verify this other data as a condition of hardware trust in addition to the challenges and responses with the hardware trust monitor. For example, NOC core 112 may maintain hardware trust with NOC 122 for a specific user network having specific VNFCs that are executed during specific hypervisor states in each NOC core. NOC cores 112 and 122 exchange hardware trust data to ensure that hardware trust from the trust monitor is current and to ensure that NOC cores 112 and 122 are executing the accurate set of VNFCs for the proper user network during the correct hypervisor states (processing threads) before allowing the hardware trusted data transfer. Likewise, NOC cores 112 and 122 may exchange hardware trust data to ensure that hardware trust from the trust monitor is current and to ensure that NOC cores 112 and 122 are executing the accurate set of VNFCs for the proper user network in the correct operating system containers before allowing the hardware trusted data transfer.

In CPU 110, NOC core 111 exchanges hardware trust data with SOC cores 111 to maintain hardware trust. NOC core 111 may transfer the hardware trust challenges and results for the hardware trust monitor, or NOC core 111 may be the hardware trust monitor. NOC core 112 exchanges hardware trust data with NOC cores 121 in CPU 120 to maintain hardware trust. NOC core 112 may be the hardware trust monitor, or the hardware trust monitor may distribute hardware trust data to NOC cores 112 for NOC core 122. For example, the hardware trust monitor may transfer certified digital certificates to with the hardware trust data. NOC cores 112 and 122 may exchange the data to establish hardware trust with one another.

SOC core 111 executes NFV VNFs 101-103 and responsively exchanges user data with NOC core 112. When hardware trust is maintained, data switch 113 in NOC core 112 exchanges user data for the VNFs 101-103 with hardware-trusted SOC cores 111. When hardware trust fails for an individual SOC core, data switch 113 blocks the exchange of user data with the individual SOC core. In some examples, SOC cores are hardwired to NOC cores and hardware trust between hardwired cores is implicit. When hardware trust is maintained between NOC cores 112 and 122, NOC core 112 exchanges user data for VNFs 101-103 with hardware-trusted NOC core 122. When hardware trust fails for an individual NOC core, data switch 113 in NOC core 112 blocks the exchange of user data with that individual NOC core.

In some examples, one of SOC cores 111 calls a NOC core Application Programming Interface (API) for a hardware-trusted data exchange. NOC core 112 then verifies hardware trust for the destination hardware before making the data exchange. Alternatively, VNF 101 may call a hypervisor API for the hardware-trusted data exchange, and the hypervisor verifies hardware trust for the destination hardware before making the data exchange. VNF 101 may call an operating system API for the hardware-trusted data exchange, and operating system verifies hardware trust for the destination before making the data exchange.

These hardware trust verifications may require the additional verification of VNFCs, user networks, processing states and containers, virtual switches, forwarding graphs, data transceivers, and the like. For example, VNF 101 may call an API requiring a hardware trusted communication using specific VNFCs in specific containers based on a specific forwarding graph. Thus, if the forwarding graph used by NOC core 122 is not accurate, the hardware trusted communication would be blocked.

In some scenarios, a VNF in a SOC core calls a hypervisor API for the hardware-trusted data exchange, and the hypervisor in the SOC core calls another hypervisor API for the hardware-trusted data exchange. Another hypervisor in the NOC core serves the other API call from the SOC hypervisor. The NOC hypervisor blocks any untrusted data exchanges. Likewise, a VNF in a SOC may call an operating system API for the hardware-trusted data exchange, and the operating system in the SOC core then calls another operating system API for the hardware-trusted data exchange. Another operating system in the NOC core serves the other API call from the SOC operating system, and the NOC operating system blocks any untrusted data exchanges.

Figure 2:
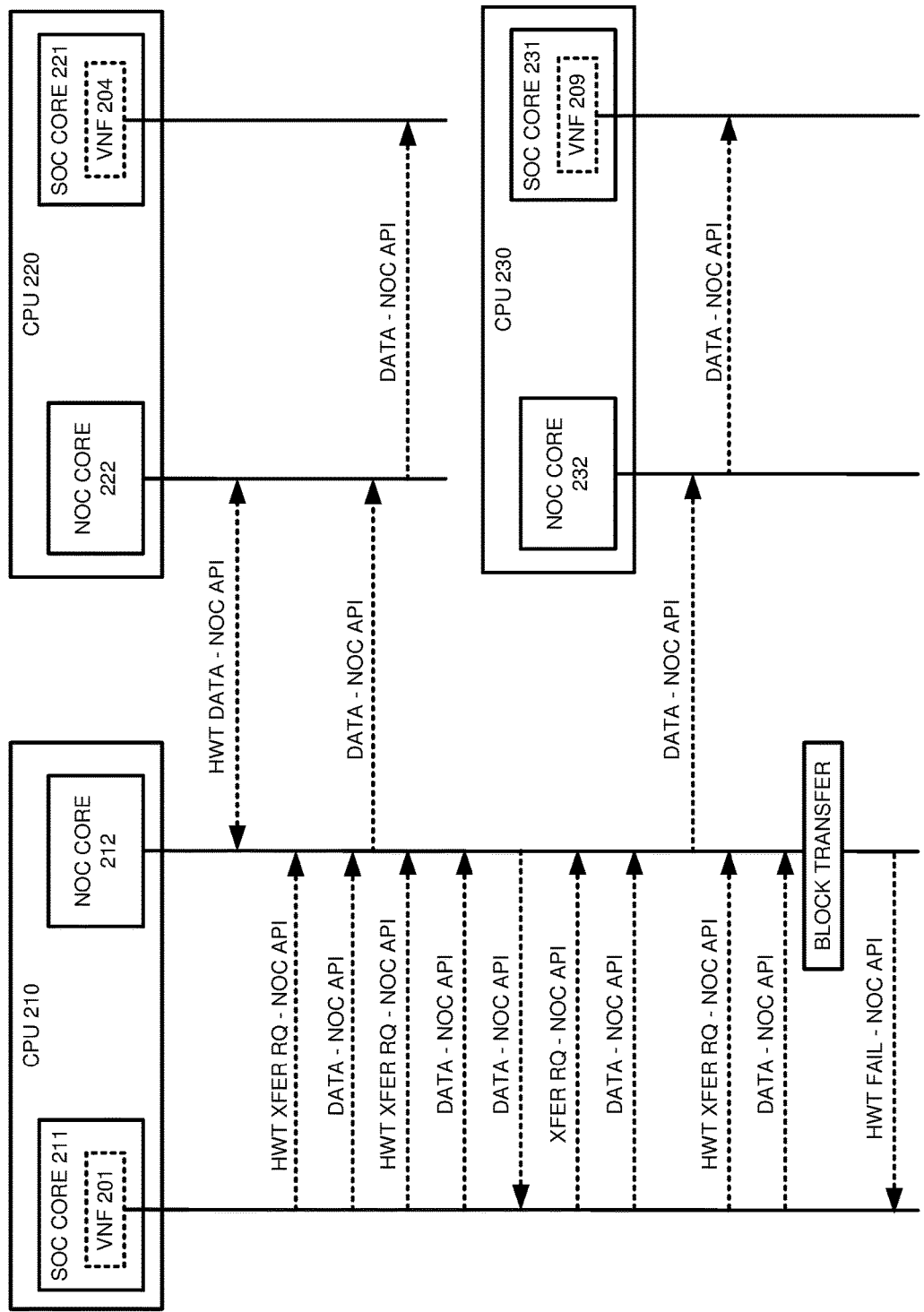
FIG. 2 illustrates the operation of an NFV data communication system that implements hardware trust for a VNF in a CPU having a SOC core and a NOC core.

FIG. 2 illustrates the operation of NFV data communication system 200 that implements hardware trust for VNFs in a CPU having a SOC core and a NOC core. NFV data communication system 200 is exemplary, and NFV data communication system 100 may use different configurations and operations. NFV data communication system 200 comprises CPUs 210, 220, and 230. CPU 210 comprises NOC core 212 and SOC core 211 that executes VNF 201. CPU 220 comprises NOC core 222 and SOC core 221 that executes VNF 204.

NOC core 212 exchanges hardware trust data with NOC cores 222 to maintain hardware trust over a NOC API. The NOC API could be a chip API, hypervisor API, or operating system API. The hardware trust data might be hardware trust challenges and hash results. Alternatively, the hardware trust data might comprise digitally certified hardware trust data from a hardware trust monitor that previously handled hardware trust challenges and hash results with NOC cores 212 and 222. NOC core 232 is untrusted at the hardware level.

SOC core 211 executes NFV VNF 201. VNF 201 drives SOC core 211 to transfer a request over the NOC API for a hardware trusted data transfer to VNF 204. VNF 201 also drives SOC core 211 to transfer user data over the NOC API to NOC core 212. The NOC API might could be a chip API, hypervisor API, or operating system API. NOC core 212 verifies the current hardware trust of NOC core 222 before transferring the user data to NOC core 222 for delivery to VNF 204. If the hardware trust verification had failed, NOC core 212 would block the user data transfer. NOC core 212 transfers the user data to NOC core 222 over the NOC API. NOC core 222 transfers the user data to SOC core 221 over the NOC API. SOC core 221 delivers the user data to VNF 104.

This hardware trust verification may require the additional verification of other data like VNFCs, user networks, processing states and containers, virtual switches, forwarding graphs, data transceivers, and the like. For example, VNF 201 may call an API requiring a hardware trusted communication using specific wireless data transceivers. Thus, if the data transceiver used by NOC core 222 is not correct, NOC core 112 would block the hardware trusted communication.

VNF 201 then drives SOC core 211 to transfer a request for a hardware trusted data transfer over the NOC API to another VNF in SOC core 211. VNF 201 also drives SOC core 211 to transfer user data over the NOC API to NOC core 212. In this example, NOC core 212 has implicit hardware trust of SOC core 211 through direct physical connections and transfers the user data to SOC core 212 for delivery to the other VNF.

VNF 201 then drives SOC core 211 to transfer a request over the NOC API for a data transfer to VNF 209. This request is not for a hardware-trusted communication. VNF 201 drives SOC core 211 to transfer user data over the NOC API to NOC core 212. NOC core 222 transfers the user data to NOC core 232 over the NOC API without hardware trust verification. NOC core 232 delivers the user data to SOC core 231, and SOC core 231 delivers the user data to VNF 209.

VNF 201 now drives SOC core 211 to transfer a request over the NOC API for a hardware trusted data transfer to VNF 209. VNF 201 also drives SOC core 211 to transfer user data over the NOC API to NOC core 212. NOC core 212 verifies hardware trust of NOC core 232 before transferring the user data to NOC core 232 for delivery to VNF 209. Since hardware trust fails in this case, NOC core 212 blocks the transfer of the user data. The NOC API might be a chip API, hypervisor API, or operating system API. SOC core 211 notifies VNF 201 of the failure over the NOC core API.

Figure 3:
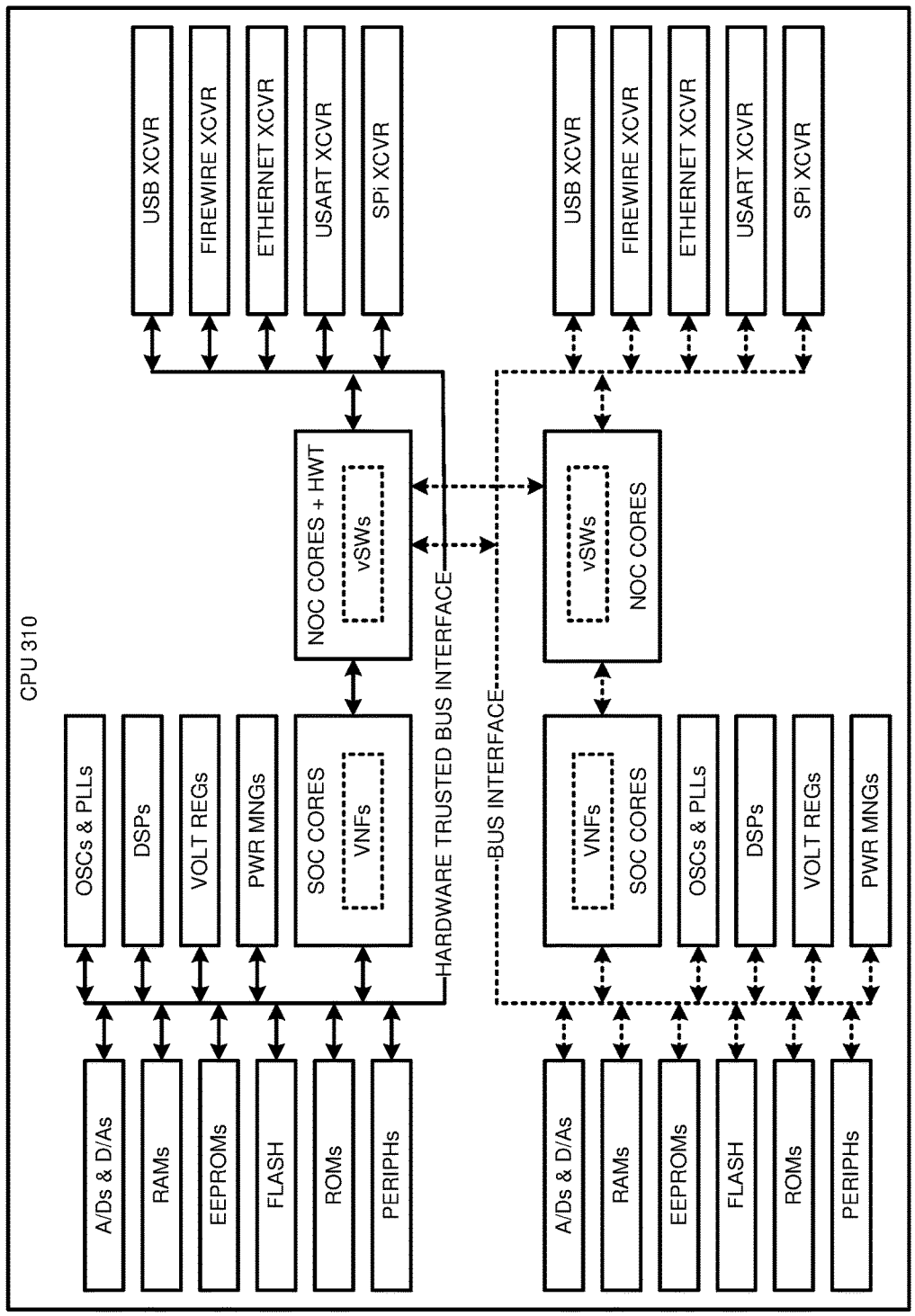
FIG. 3 illustrates a CPU having SOC cores and NOC cores to implement hardware trust for VNFs.

FIG. 3 illustrates CPU 300 having SOC cores and NOC cores to implement hardware trust for VNFs. CPU 300 is exemplary, and NFV data communication system 100 may use different configurations and operations. Some the NOC core have hardware trust controllers with physically-embedded, read-only hardware trust codes (+HWT). These NOC cores are coupled over a bus interface (solid line) to various components including SOC cores that execute VNFs. Other components on the trusted bus interface comprise: Analog-to-Digital (A/D) converters, Digital-to-Analog (D/A) converters, Random Access Memories (RAMs), Electrical Erasable Programmable Read Only Memories (EEPROM), flash memory, read-only memory (ROM), oscillators (OSC), Phase Locked Loops (PLLs), Digital Signal Processors (DSPs) voltage regulators (VOLT REG), power managers (PWR MNG), and other peripherals (PERIPHS). These NOC cores are also coupled over the bus interface to various transceivers (XCVR) like a Universal Serial Bus (USB) transceiver, firewire transceiver, Ethernet transceiver, Universal Asynchronous/Synchronous Receiver/Transmitter (USART) transceiver, and Serial Peripheral Interface (SPi) transceiver.

Hardware trust verification may entail the verification of these components as well. For example, hardware trust between NOC cores may further require the use of specific components like a specific DSP and a specific data transceiver. The API calls specify the additional hardware trust requirements. For example, a VNF may require a hardware trusted communication using a specific A/D, D/A, DSP, RAM, flash memory, SOC core, and Ethernet transceiver in each NOC core. Thus, any of these elements by the NOC cores is not accurate, then the hardware trusted communication is blocked.

Some of the NOC cores do not have hardware trust controllers or codes. These NOC cores are coupled over an untrusted bus interface (dotted line) to various components including SOC cores that execute VNFs. Other components on this other bus interface comprise: A/D converters, D/A converters, RAMs, EEPROMs, flash memory, ROM, oscillators, PLLs, DSPs, voltage regulators, power managers, and other peripherals. These other NOC cores are coupled over the bus interface to various transceivers like a USB transceiver, firewire transceiver, Ethernet transceiver, USART transceiver, and SPi transceiver.

The NOC cores that include the hardware trust controllers are coupled together. The NOC cores without any hardware trust controllers are also coupled together. All the NOC cores execute Virtual Switches (vSWs) to route data between their transceivers and their SOCs or other components. The NOCs with the hardware trust controllers are coupled to the both bus interfaces (trusted and untrusted) and have full CPU access. The NOCs without hardware trust controllers are not coupled to the trusted bus interface (solid line) and do not have full CPU access.

The NOC core with the hardware trust controller exchanges hardware trust data with a hardware trust monitor and with other NOC cores to maintain hardware trust. The hardware trust controller responds to hardware trust challenges from the hardware trust monitor by hashing its hardware trust identifier with the challenge key and returning the hash result. The hardware trust controller receives digital certificates from the hardware trust monitor and shares these certificates with other NOC cores to establish hardware trust.

The hardware trust controller directs the trusted vSWs to make hardware trusted data transfers to the SOCs and other components over the trusted bus interface. The hardware trust controller directs the trusted vSWs to block any hardware trusted data transfers over the trusted transceivers to any untrusted NOC cores. The trusted vSWs block hardware trusted data transfers to the vSWs in the untrusted NOC cores. The trusted vSWs block hardware trusted data transfers to the untrusted SOCs, transceivers, and other components on the untrusted bus interface.

The SOC cores execute NFV VNFs and responsively exchange user data with the NOC cores. When hardware trust is a requirement, the hardware trust controllers in the NOC cores direct the vSWs to make the transfers if the next-hop NOC cores are hardware trusted. When hardware trust fails for an external NOC core, the hardware trust controller directs the trusted vSWs to block the hardware trusted data exchanges with the individual NOC core. Special hardware trust requirements like the use of specific wireless transceivers and operating system containers may also be enforced during this hardware trust verification process.

In some examples, the VNFs direct the SOC cores to call NOC APIs for hardware-trusted data exchanges. The NOC cores then verify hardware trust for the next-hop NOC cores before making the data exchanges. The NOC API could be a chip API, hypervisor API, or operating system API. Thus, a hypervisor in the upper NOC core may call a hypervisor API on a hypervisor in another NOC core to maintain hardware trust and transfer hardware trusted data.

Figure 4:
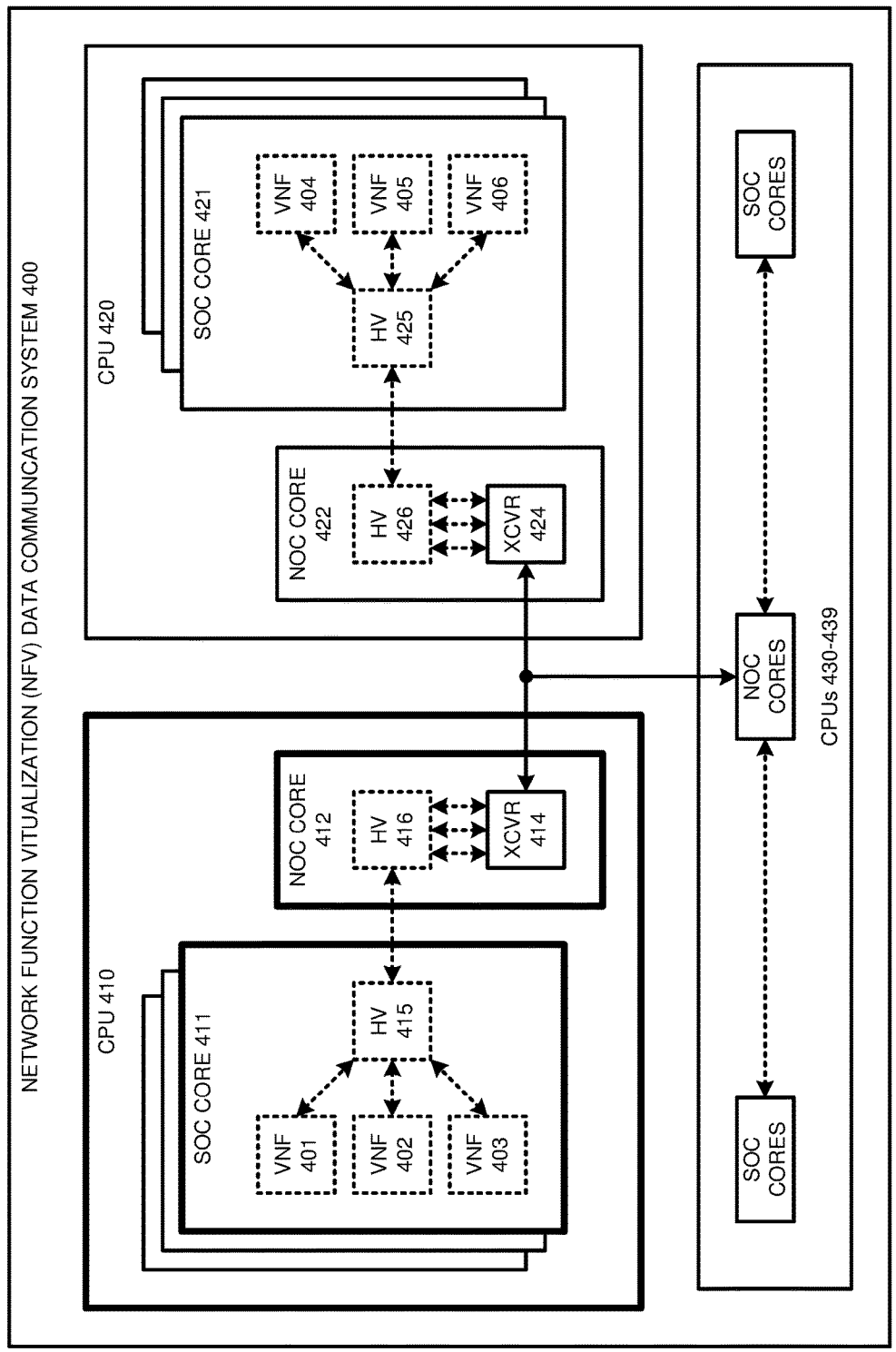
FIG. 4 illustrates an NFV data communication system that implements hardware trust for VNFs in CPUs having hypervisor driven SOC cores and NOC cores.

FIG. 4 illustrates NFV data communication system 400 that implements hardware trust for VNFs 401-406 in CPUs 410 and 420 that have hypervisor driven SOC cores 411 and 421 and NOC cores 412 and 422. NFV data communication system 400 is exemplary, and NFV data communication system 100 may use different configurations and operations. NFV communication system 400 comprises CPUs 410, 420, and 430-439. CPU 410 comprises multiple cores including SOC core 411 and NOC core 412. SOC core 411 comprises VNFs 401-403 and hypervisor 415. NOC core 412 comprises hypervisor 416 and transceiver 414. Likewise, CPU 420 comprises multiple cores including SOC core 421 and NOC core 422. SOC core 421 comprises VNFs 404-406 and hypervisor 425. NOC core 422 comprises hypervisor 426 and transceiver 424.

NFV data communication system 400 implements hardware trust for VNFs 401-406. An external hardware trust monitor (not shown) sends a random number challenge to hypervisor 416. Hypervisor 416 reads a physically-embedded read-only hardware identifier from NOC core 412 and hashes the identifier with the random number. Hypervisor 416 transfers the hash result for external hardware trust verification by the hardware trust monitor. The external hardware trust monitor sends a random number challenge to hypervisor 426. Hypervisor 426 reads a physically-embedded read-only hardware identifiers from NOC core 422 and hashes the identifier with the random number. Hypervisor 426 transfers the hash result for external hardware trust verification by the hardware trust monitor.

The hardware trust monitor distributes hardware trust data for CPUs 410 and 420, NOC cores 412 and 422, and hypervisors 416 and 426. The hardware trust data includes digital certificates for hypervisors 416 and 426 to exchange and establish hardware trust. Hypervisors 416 and 426 exchange additional hardware trust and requirements data like hypervisor states and processing threads, virtual switch identifiers, VNF identifiers, VNF Component (VNFC) identifiers, SOC identifiers, NOC identifiers, network identifiers, service identifiers, data transceiver identifiers, wireless data communication protocols, network addresses, user/device identifiers, forwarding graphs, uniform resource identifiers, and the like.

To exchange data, VNF 401 calls a guest operating system API for a hardware trusted communication with VNF 406 and additional requirements may be specified. The guest operating system then calls a virtual machine API for the hardware trusted communication between VNFs 401 and 406. The virtual machine calls a hypervisor API for the hardware trusted communication between VNFs 401 and 406. Hypervisor 415 calls a hypervisor API on hypervisor 416 in NOC core 412 for the hardware trusted communication between VNFs 401 and 406.

In response to the hypervisor API call for the hardware trusted communication between VNFs 401 and 406, hypervisor 416 in NOC core 412 verifies hardware trust for hypervisor 426 in NOC core 422. Any additional hardware trust requirements in the API data are also verified. If hardware trust current, hypervisor 416 in NOC core 412 exchanges user data for VNF 401 with transceiver 414 for delivery to transceiver 424. When hardware trust fails between NOC cores 412 and 422, hypervisor 416 in NOC core 412 blocks user data exchanges for VNF 401 to transceiver 424.

VNF 401 then calls the guest operating system API for a hardware trusted communication with a VNF in untrusted CPU 430. The guest operating system calls the virtual machine API for the hardware trusted communication between the VNFs. The virtual machine calls a hypervisor API for the hardware trusted communication between the VNFs. Hypervisor 415 calls a hypervisor API on hypervisor 416 in NOC core 412 for the hardware trusted communication between the VNFs.

In response to the hypervisor API call for the hardware trusted communication between the VNFs, hypervisor 416 in NOC core 412 verifies hardware trust for the hypervisor in the NOC core in CPU 430—including the verification of any additional hardware trust requirements. If hardware trust is current, hypervisor 416 in NOC core 412 exchanges user data for VNF 401 with a transceiver in CPU 430. When hardware trust fails between NOC cores 412 and 430, hypervisor 416 in NOC core 412 blocks user data exchanges to the transceiver in CPU 430.

Figure 5:
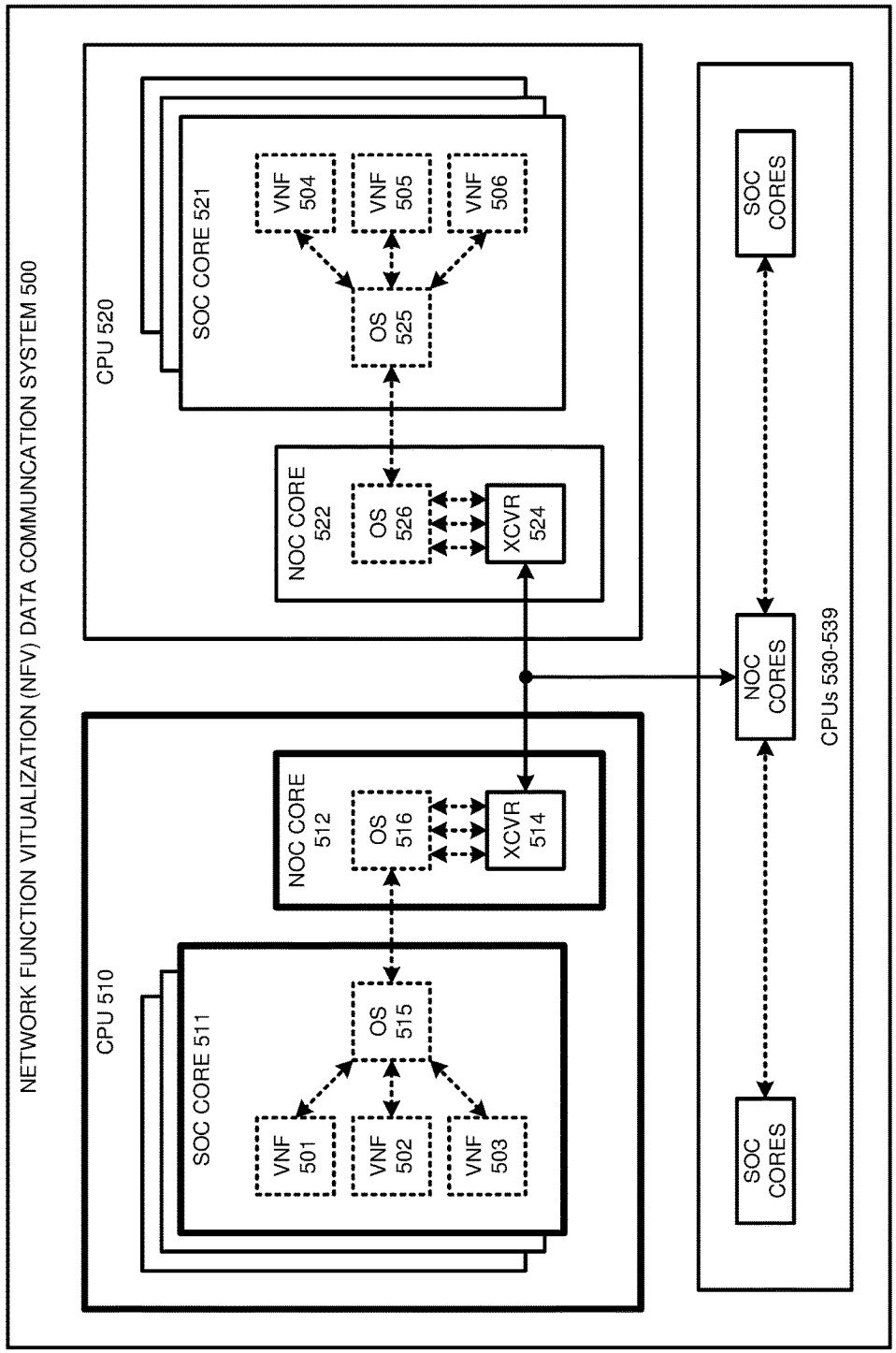
FIG. 5 illustrates an NFV data communication system that implements hardware trust for VNFs in CPUs having operating system driven SOC cores and NOC cores.

FIG. 5 illustrates NFV data communication system 500 that implements hardware trust for VNFs 501-506 in CPUs 510 and 520 that have operating system driven SOC cores 511 and 521 and NOC cores 512 and 522. NFV data communication system 500 is exemplary, and NFV data communication system 100 may use different configurations and operations. NFV communication system 500 comprises CPUs 510, 520, and 530-539. CPU 510 comprises multiple cores including SOC core 511 and NOC core 512. SOC core 511 comprises VNFs 501-503 and Operating System (OS) 515. NOC core 412 comprises OS 516 and transceiver 514. Likewise, CPU 520 comprises multiple cores including SOC core 521 and NOC core 522. SOC core 521 comprises VNFs 504-506 and OS 525. NOC core 522 comprises OS 526 and transceiver 524.

NFV data communication system 500 implements hardware trust for VNFs 501-506. An external hardware trust monitor (not shown) sends a random number challenge to OS 516. OS 516 reads a physically-embedded read-only hardware identifiers from NOC core 512 and hashes the identifier with the random number. OS 516 transfers the hash result for external hardware trust verification by the hardware trust monitor. The external hardware trust monitor sends a random number challenge to OS 526. OS 526 reads a physically-embedded read-only hardware identifiers from NOC core 522 and hashes the identifier with the random number. OS 526 transfers the hash result for external hardware trust verification by the hardware trust monitor.

The hardware trust monitor distributes hardware trust data for CPUs 510 and 520, NOC cores 512 and 522, and OS's 516 and 526. The hardware trust data includes digital certificates for OS's 516 and 526 to exchange and establish hardware trust. OS's 516 and 526 then exchange additional hardware trust data like additional trust requirements, container identifiers, VNF identifiers, VNFC identifiers, SOC identifiers, NOC identifiers, network identifiers, service identifiers, data transceiver identifiers, wireless data communication protocols, network addresses, user/device identifiers, forwarding graphs, uniform resource identifiers, and the like.

To exchange data, VNF 501 calls an OS API for a hardware trusted communication with VNF 506. OS 515 then calls an OS API on OS 516 in NOC core 512 for the hardware trusted communication between VNFs 501 and 506. Additional hardware trust requirements may be specified over the APIs. In response to the OS API call for the hardware trusted communication between VNFs 501 and 506, OS 516 in NOC core 512 verifies hardware trust for OS 526 in NOC core 522—including verifying any additional requirements. If hardware trust is current, OS 516 in NOC core 512 exchanges user data for VNF 501 with transceiver 514 for delivery to transceiver 524. When hardware trust fails between NOC cores 512 and 522, OS 516 in NOC core 512 blocks user data exchanges to transceiver 524.

VNF 501 then calls an OS API for a hardware trusted communication with a VNF in untrusted CPU 530. In response, OS 515 calls an OS API on OS 516 for the hardware trusted communication between the VNFs. In response to the OS API call for the hardware trusted communication between the VNFs, OS 516 in NOC core 512 verifies hardware trust for the OS in the NOC core in CPU 530. If hardware trust is current, OS 516 in NOC core 512 exchanges user data for VNF 501 with transceiver 514 for delivery to a transceiver in CPU 430. When hardware trust fails between NOC cores 512 and 530, OS 516 in NOC core 512 blocks user data exchanges to the transceiver in CPU 530.

Figure 6:
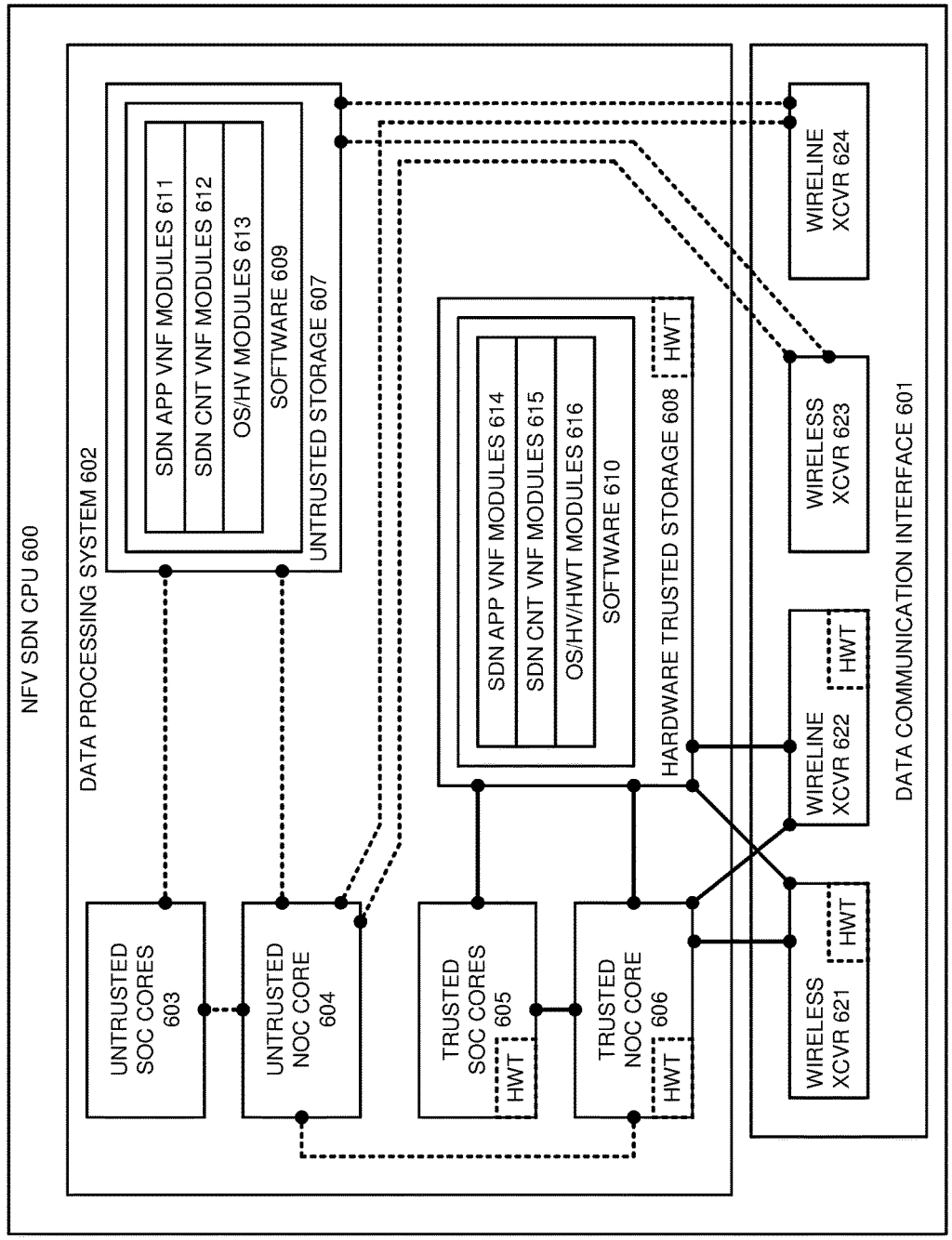
FIG. 6 illustrates a CPU having SOC cores and NOC cores to implement hardware trust for Software-Defined Network (SDN) VNFs.

FIG. 6 illustrates NFV SDN CPU 600 having SOC cores 604 and NOC 606 cores to implement hardware trust for Software-Defined Network (SDN) VNFs. NFV SDN CPU 600 is exemplary, and NFV data communication system 100 may use different configurations and operations. NFV SDN CPU 600 comprises data communication interface 601 and data processing system 602. Data communication interface 601 comprises data transceivers 621-624. Data processing system 602 comprises processing circuitry cores 603-606 and storage systems 607-608. Storage systems 607-608 store software 609-610. Software 609-610 includes respective software modules 611-616.

Processing circuitry cores 605-606, storage system 608, and data transceivers 621-622 each have a unique and secret physically-embedded read-only hardware trust code and a hardware trust controller (HWT). The hardware trust controllers read the hardware trust codes, perform the hashing, and transfer the results. OS/HV/HWT modules 616 may also perform the role of HWT monitor by issuing HWT challenges and validating HWT answers.

Data machine transceivers 621-624 comprise communication components, such as ports, bus interfaces, signal processors, memory, software, interface cards, and the like. Processing circuitry cores 603-606 comprise bus interfaces, integrated circuitry, RAM, and associated electronics. Storage systems 607-608 comprise non-transitory, machine-readable, data storage media, such as RAM, flash drives, disc drives, memory circuitry, data servers, and the like. Software 609-610 comprises machine-readable instructions that control the operation of processing circuitry 603-606 when executed. All or portions of software 609-610 may be externally stored on one or more storage media, such as circuitry, discs, and the like.

When executed by untrusted SOC processing core 603, software modules 611-612 direct SOC core 603 to perform the following operations. SDN application VNF modules 611 process user and network data to drive SDN controller modules 612 to deliver data communication services to users. SDN controller VNF modules 612 process the SDN controller API calls to generate SDN switch API calls to drive SDN switches and NFV vSWs to deliver the data communication services to the users. When executed by untrusted NOC processing core 604, OS/HV modules 613 support SDN VNF communications with a data processing environment. OS/HV modules 613 use data transceivers 623-624 to handle user data for the data communication service.

When executed by trusted SOC processing core 605, software modules 614-615 direct SOC core 605 to perform the following operations. SDN application VNF modules 614 process user and network data to drive SDN controller modules 615 to deliver data hardware trusted communication services to users. SDN controller VNF modules 615 process the SDN controller API calls to generate SDN switch API calls to drive SDN switches and NFV vSWs to deliver the hardware trusted data communication services to the users. When executed by trusted NOC processing core 605, OS/HV/HWT modules 616 support SDN VNF communications and block VNF data transfers to untrusted hardware. OS/HV/HWT modules 616 use data transceivers 621-622 to handle user data for the hardware trusted data communication service.

Some conventional aspects of SDN NFV CPU are omitted for clarity, such as power supplies, substrate, and the like. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a Network Function Virtualization (NFV) Central Processing Unit (CPU) comprising an internal Network-On-Chip (NOC) core and multiple internal System-On-Chip (SOC) cores to communicate with external NFV CPUs comprising external NOC cores and external SOC cores, the method comprising:
   the internal NOC core exchanging hardware trust data with the external NOC cores to maintain hardware trust with the external NOC cores;
   the internal SOC cores executing NFV Virtual Network Functions (VNFs) and responsively calling a NOC core Application Program Interface (API) for a hardware-trusted data exchange;
   the internal NOC core exchanging an allowed portion of user data for the NFV VNFs among the internal SOC cores and the external NOC cores; and
   in response to the NOC core API call for the hardware-trusted data exchange, the internal NOC core blocking a trusted block of the user data as part of a disallowed portion of the user data to an individual one of the external NOC cores when the hardware trust fails between the internal NOC core and the individual one of the external NOC cores.

2. The method of claim 1 wherein the internal SOC cores calling a NOC API for a hardware-trusted data exchange and the internal NOC core blocking the trusted block of the user data as part of the disallowed portion of the user data to the individual one of the external NOC cores when the hardware trust fails comprises:
   one of the NFV VNFs in one of the internal SOC cores calling a hypervisor API for the hardware-trusted data exchange;
   a hypervisor in the one of the internal SOC cores calling another hypervisor API for the hardware-trusted data exchange responsive to the hypervisor API call; and
   another hypervisor in the internal NOC core blocking the trusted block of the user data as part of the disallowed portion of the user data responsive to the other hypervisor API call for the hardware-trusted data exchange.

3. The method of claim 1 wherein the internal SOC cores calling a NOC core API for a hardware-trusted data exchange and the internal NOC core blocking the trusted block of the user data as part of the disallowed portion of the user data to the individual one of the external NOC cores when the hardware trust fails comprises:

one of the NFV VNFs in one of the internal SOC cores calling an operating system API for the hardware-trusted data exchange;

an operating system in the one of the internal SOC cores calling another operating system API for the hardware-trusted data exchange; and another operating system in the internal NOC core blocking the trusted block of the user data as part of the disallowed portion of the user data responsive to the other operating system API call for the hardware-trusted data exchange.

4. The method of claim 1 wherein the internal NOC core exchanging the hardware trust data comprises the internal NOC core exchanging VNF Component (VNFC) identifiers.

5. The method of claim 1 wherein the internal NOC core exchanging the hardware trust data comprises the internal NOC core exchanging SOC identifiers and NOC identifiers.

6. The method of claim 1 wherein the internal NOC core exchanging the hardware trust data comprises the internal NOC core exchanging hypervisor state information.

7. The method of claim 1 wherein the internal NOC core exchanging the hardware trust data comprises the internal NOC core exchanging operating system container information.

8. The method of claim 1 wherein the internal NOC core exchanging the hardware trust data comprises the internal NOC core exchanging data transceiver identifiers.

9. The method of claim 1 wherein the internal NOC core exchanging the hardware trust data comprises the internal NOC core exchanging wireless communication protocol data.

10. A Network Function Virtualization (NFV) Central Processing Unit (CPU) comprising an internal Network-On-Chip (NOC) core and multiple internal System-On-Chip (SOC) cores to communicate with external NFV CPUs comprising external NOC cores and external SOC cores, the NFV CPU comprising:

the internal NOC core configured to exchange hardware trust data with the external NOC cores to maintain hardware trust with the external NOC cores;

the internal SOC cores configured to execute NFV Virtual Network Functions (VNFs) and responsively call a NOC core Application Program Interface (API) for a hardware-trusted data exchange;

the internal NOC core configured to exchange an allowed portion of the user data for the NFV VNFs among the internal SOC cores and the external NOC cores; and in response to the NOC core API call for the hardware-trusted data exchange, the internal NOC core configured to block a trusted block of the user data as part of a disallowed portion of the user data to an individual one of the external NOC cores when the hardware trust fails between the internal NOC core and the individual one of the external NOC cores.

11. The NFV CPU of claim 10 wherein:

one of the NFV VNFs in one of the internal SOC cores is configured to call a hypervisor API for the hardware-trusted data exchange;

a hypervisor in the one of the internal SOC cores is configured to call another hypervisor API for the hardware-trusted data exchange responsive to the hypervisor API call; and another hypervisor in the internal NOC core is configured to block the trusted block of the user data as part of the disallowed portion of the user data responsive to the other hypervisor API call for the hardware-trusted data exchange.

12. The NFV CPU of claim 10 wherein:

one of the NFV VNFs in one of the internal SOC cores is configured to call an operating system API for the hardware-trusted data exchange;

an operating system in the one of the internal SOC cores is configured to call another operating system API for the hardware-trusted data exchange; and another operating system in the internal NOC core is configured to block the trusted block of the user data as part of the disallowed portion of the user data responsive to the other operating system API call for the hardware-trusted data exchange.

13. The NFV CPU of claim 10 wherein the hardware trust data comprises VNF Component (VNFC) identifiers.

14. The NFV CPU of claim 10 wherein the hardware trust data comprises SOC identifiers and NOC identifiers.

15. The NFV CPU of claim 10 wherein the hardware trust data comprises hypervisor state information.

16. The NFV CPU of claim 10 wherein the hardware trust data comprises operating system container information.

17. The NFV CPU of claim 10 wherein the hardware trust data comprises data transceiver identifiers.

18. The NFV CPU of claim 10 wherein the hardware trust data comprises wireless communication protocol data.

* * * * *